United States Patent [19]

Pickering et al.

[11] 4,230,124

[45] Oct. 28, 1980

[54] OUTPUT DISPLAY FOR B-SCAN ULTRASONOSCOPE

[75] Inventors: Norman C. Pickering; Nathaniel R. Bronson, II, both of Southampton, N.Y.

[73] Assignee: High Stoy Technological Corporation, Bohemia, N.Y.

[21] Appl. No.: 939,090

[22] Filed: Sep. 1, 1978

[51] Int. Cl.³ .............................................. G01S 9/66
[52] U.S. Cl. ...................................... 128/660; 358/112
[58] Field of Search ............................... 128/660–663; 358/112

[56] References Cited

U.S. PATENT DOCUMENTS

| | | | |
|---|---|---|---|
| 3,864,660 | 2/1975 | Ronalli et al. | 340/1 R |
| 3,909,771 | 9/1975 | Pickering et al. | 340/1 R |
| 4,121,250 | 10/1978 | Huelsnan | 358/140 |

OTHER PUBLICATIONS

Bronson, N. R. et al., "Clinical Results with Real-Time Color B-Scan Ultrasonography" *Ultrasound in Medicine*, vol. 4, Plenum Publ., N.Y., publ. May 16, 1978.

Ito, K. et al., "Digital Image Processing of Ultrasonography", JEE No. 115, pp. 47–50, Jul. 1976.

Carter, C. R. et al., "A Color-Coded Display for Signals from Radar & Sonar", CONF: Canadian Comm. & Power Conf., Montreal, Oct. 20–22, 1976.

*Primary Examiner*—Robert W. Michell
*Assistant Examiner*—Francis J. Jaworski
*Attorney, Agent, or Firm*—Robert Scobey

[57] ABSTRACT

A B-scan ultrasonoscope which can be used for scanning tissue, for example the human eye, and displays the shape and character of the tissue. The echo pulses received are converted into digital signals whose amplitudes represent the reflectivity of the tissue. The digital signals are then displayed on a color display in accordance with a desired color scale, with individual digital increments respectively representing preselected colors. Alternate increments are maintained as black, whereby the active colors are interleaved with bands of black. In this manner, tissue interfaces are more easily seen and visual acuity is improved.

13 Claims, 3 Drawing Figures

OUTPUT DISPLAY FOR B-SCAN ULTRASONOSCOPE

BACKGROUND OF THE INVENTION

This invention relates to an optical display system and, more particularly, to an improved display of a B-scan ultrasonoscope.

The use of ultrasonic vibrational energy for sensing and displaying the shape and character of objects has long been known. More recently such ultrasonic detection and display systems have also been utilized for scanning of human tissue. Because the ultrasonic energy avoids damage to the issue, such scanning and display has been found especially useful in connection with sensitive portions of the body as, for example, the human eye.

While the transmission and reception of ultrasonic energy pulses is well known, when utilized in connection with human tissue, appropriate visual display becomes a major concern. In connection with human tissue scanning, not only are distance, shape and size of items of importance, but the density of the tissue is an important factor in the display.

In providing a suitable display, it has previously been known to present the reflected echoes on a picture tube either as the A-scan method or the B-scan method. In the A-scan technique, the transducer generates the pulse and is stationary with respect to the medium and the tissues contained therein. The echoes are then received and displayed as vertical deflections of the CRT tracing. The horizontal deflection is proportional to time and may be calibrated to indicate distance. The pulse stream displayed on the CRT screen will, therefore, represents an irregular "picket fence" with the height of the pickets indicating the strength of the echoes and the spacing between pickets showing depth information. In such display the brightness of the trace on the tube carries no information.

As a result, in order to achieve display of the geometric arrangement of the tissue without losing reflectivity information, it is preferable to utilize the B-scan technique. In this method the transducer is moved across the tissue with the position of the vertical trace of the CRT being synchronized to follow the direction of the movement. The horizontal trace is again relative to time and, therefore, equivalent to distance. The brightness of the spots, however, indicates the echo strength and therefore the difference in acoustic impedance of the tissue is detected. In this technique a two dimensional or cross sectional picture of the anatomical structure being scanned is seen on the CRT screen.

Although the B-scan technique is preferable, visualization of the intensity or brightness is still limited because of the limitation of the CRT tube itself. The tissue echoes may cover a wide range of densities which may extend over 30 db or more. However, the brightness range of the CRT tube is limited to a narrower range, typically 18–20 db.

In order to solve this problem, it has heretofore been suggested to utilize a color display to achieve better recognition of the different densities of the tissue being scanned. One such prior art technique utilizing a color display has been described in U.S. Pat. No. 3,909,771 issued to the present inventors on Sept. 30, 1975, for "OPHTHALMIC B-SCAN APPARATUS". In that patent, there is described a technique for sending out ultrasonic pulses to the tissue and receiving the echo pulses which are reflected by appropriate structures in the tissue. These echo pulses are then converted to electrical signals which are then changed in digital values. The digital values represent incremental steps of a predetermined first continuous functional relationship with respect to the echo pulses received. The digital pulses are then converted into their binary coded decimal value and again converted into a second series of signals whose values represent incremental steps of another predetermined continuous functional relationship with the original echo pulses. These last series of signals are then respectively applied to color guns of a color display to appropriately display each signal in a preselected color.

Each of the predetermined continuous functional relationships can be selected in such a manner to accommodate the brightness range of the echo pulse intensity and also to accommodate the display such as the CRT tube.

While the aforementioned patent provides an improvement in the display by permitting visualization of tissue density, it has been found that the colors merge almost imperceptibly into each other and tissue interfaces are not easily seen.

Additionally, visual acuity is not very sharp and proper perception of the objects or bodies in the tissue causing the reflection is not clear. It is difficult to exactly determine the edges of the tissue and the visualization is not very sharp.

SUMMARY OF THE INVENTION

It is accordingly an object of the present invention to provide an improved B-scan ultrasonoscope which avoids the aforementioned problems of prior art devices.

Another object of the present invention is to provide a B-scan ultrasonoscope with an improved optical display output of the scanned image.

Still a further object of the present invention is to provide a B-scan ultrasonoscope which permits improved visual acuity of the information scanned.

Another object of the present invention is to provide a B-scan ultrasonoscope which can be utilized for scanning human tissue and which provides an improved output display permitting detection of tissue interfaces.

Yet another further object of the present invention is to provide a B-scan ultrasonoscope with an output display which permits displaying of the output image in active color with bands of black separating the colors.

Briefly, the invention provides for a B-scan ultrasonoscope for displaying a medium, such as human tissue. An ultrasonic transmitter radiates ultrasonic signals into the medium containing the human tissues. An ultrasonic receiver receives the echo pulses reflected from portions of the medium. The echo pulses are then converted into electrical signals corresponding to the echo pulses with the amplitude of the electrical signals corresponding to the intensity of the echo pulses. The amplitude of each electrical signal is then converted into a digital value. The digital values extend over a range corresponding to the intensity range of the echo pulses. A color display is provided which can display colors ranging over a predetermined color scale. The range of digital values is decoded into continuous incremental steps. Alternate ones of the incremental steps are coupled to the color display so that each of these alternate ones can display a respective incremental descrete color from the predetermined color scale. The remaining ones of the incremental steps provide a black output on the color display means. For each of the digital values which are converted from the electrical signals, the corresponding incremental step is identified and the appropriate color is displayed. In this manner the medium is displayed in active colors outlined with bands of black to enhance visual acuity and identify surface interfaces within the medium.

In embodiment of the invention, an additional programming arrangement is also included which couples each of the incremental steps consecutively to corresponding descrete consecutive incremental colors spanning the color scale. With this type of display, all of the colors are utilized without any bands of black surrounding the tissues. A switch is provided for selectively determining which type of output display is utilized.

The invention also contemplates a method of displaying in color a medium by using a B-scan ultrasonoscope in conjunction with a color display output unit. The output can be displayed using a continuous color scale or by interleaving the active colors with bands of black.

The aforementioned objects, features and advantages of the invention will, in part, be pointed out with particularity and will, in part, become obvious from the following more detailed description of the invention taken in conjunction with the accompanying drawing, which forms an integral part thereof.

BRIEF DESCRIPTION OF THE DRAWING

In the drawings.

In the various figures of the drawing, like reference characters designate like parts.

DESCRIPTION OF THE PREFERRED EMBODIMENTS

Figure 1:
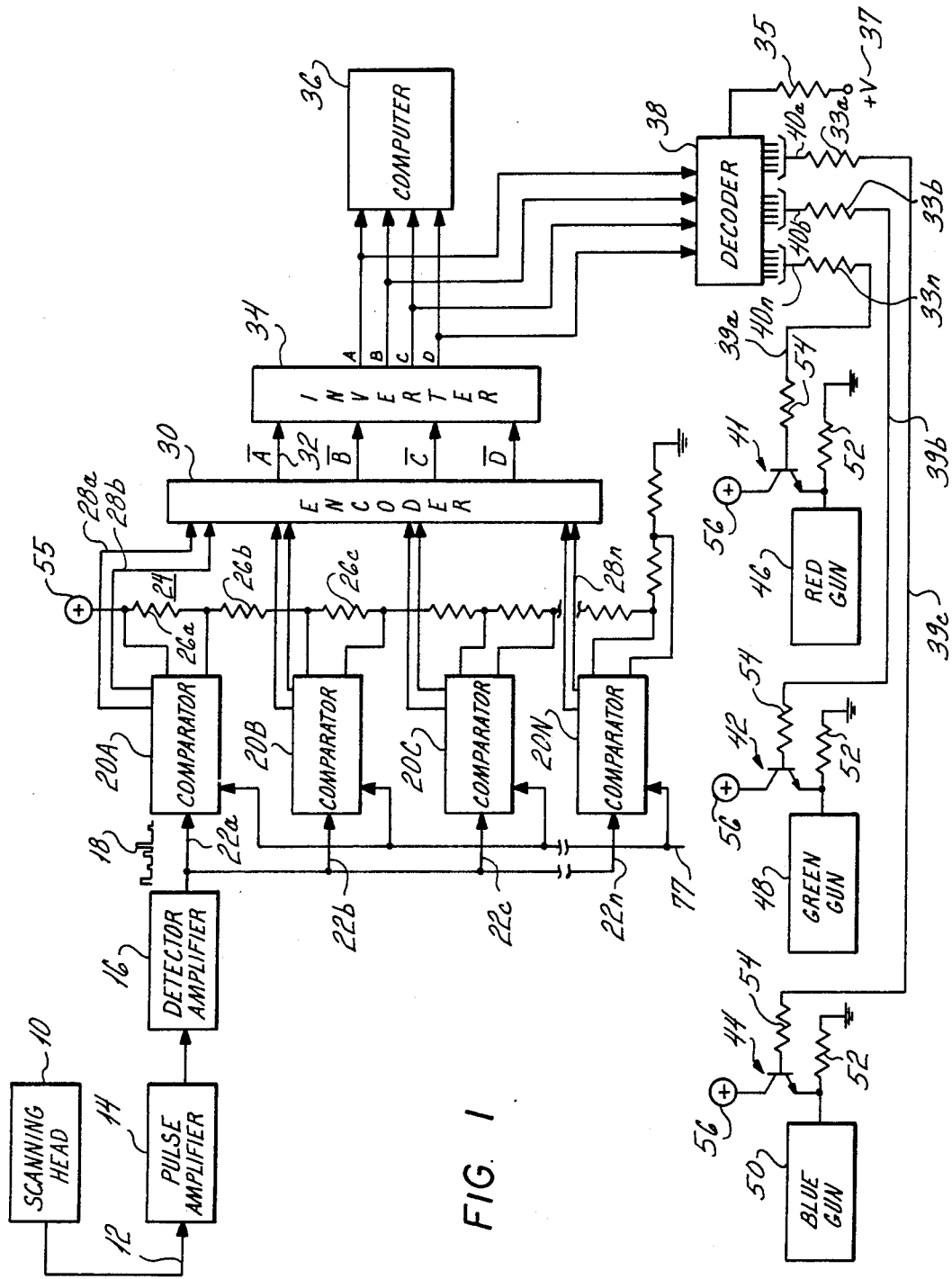
FIG. 1 shows the basic circuit of a B-scan ultrasonoscope producing a color output display.

The basic B-scan ultrasonoscope which is being utilized in the present invention is shown in FIG. 1. It will be recognized that this drawing is substantially the same as is described in the aforementioned U.S. Pat. No. 3,909,771. Accordingly, only a brief description of this circuit will hereinafter be presented, it being understood that a fuller description can be taken from the aforementioned patent.

Briefly, a scanning head 10 is provided which contains the necessary peizoelectric transducer which is moved back and forth across a window in the scanner by means of a motor drive or other well known drive source. The transducer is caused to transmit an acoustic pulse by placing a sudden electrical potential across two faces of the transducer. Such electric potential can be provided by means of a pulse generator (not shown).

The acoustic signal is sent out into the medium, typically an eye containing human tissue and portions of the eye will reflect the acoustic signal. When an echo is returned from the tissue, it is again detected by the transducer in the scanning head and an electrical pulse is produced on line 12. The pulse is fed through a pulse amplifier 14 which drives a detector amplifier 16. This amplifier produces a train of pulses the amplitudes of which represent tissue echoes by degree of ultrasonic reflectivity, and the spacing in time of which represents distances inside the anatomy being scanned. These pulses are typically being shown at 18.

The pulses are then applied to a bank of high speed comparators 20A, 20B, 20C . . . 20N. The number of comparators used can be predetermined and can be as many as desired. Normally, a binary system would be used with a total of 8 comparators, each providing two outputs.

The train of pulses serve as input to the comparator along the lines 22A, 22B, 22C, . . . 22N. The other inputs to the comparators are supplied from a resistance voltage divider shown generally at 24 which includes a string of individual resistors 26A, 26B, 26C . . . 26N. The resistance values are fixed such that the resistance value of 26A is greater than that of 26B, which is greater than that of 26C, etc.

In this manner, an increasing step wise comparison can be had. When a pulse is applied to the comparator, all comparators below the actual peak level of the pulse will trigger, while those above the peak level will not trigger. The output from the comparators are taken along line 28A, 28B, . . . 28N.

The output from the comparators are applied to an encoder 30 for converting a serial code of step values into a binary coded decimal, 1248 code. Typically, a priority encoder 30 is used which provides an inverted output on lines 32 which is then reinverted by the inverter 34 to provide an output on the four transmission lines ABCD. At this point, the amplitude data is available in a form which can be read by any standard computer, shown generally at 36, or other data handling equipment.

For display, the four lines ABCD are applied to the binary coded decimal-to-decimal decoder 38. This device converts the data back to an N line code. The outputs of the decoder in groups feed a set of parallel lines 40A, 40B . . . 40N, each containing a respective series resistor 33A, 33B, . . . 33N. The decoder is energized through a dropping resistor 35 connected to a positive supply voltage 37. The resistance values are such that the resistor 33A is less than 33B which, in turn, is less than 33N. In this manner the lines at the output of the decoder 38 each represent a step value similar to the values of the output of the comparator.

By fixing the values of the resistor at the output of the comparators 20A, 20B . . . 20N, as well as the resistors at the output of the decoder 38, both of the conversions can be fixed as either a linear step increment, a logarithmetic step increment, or other step. This permits tailoring of the output voltages to fit the voltage brightness curve of the display tube. The output voltage across each resistor will be developed as a result of the voltage 37 and a comparison of the resistance value of resistor 35 with the particular resistance value in the lines. The output voltage along lines 39a, 39b, 39C, will therefore vary in accordance with the steps preset by the resistors in their respective lines. These output voltages feed three amplifiers, 41, 42, 44 each of which controls respectively one of the three color guns of the CRT, namely the red gun 46, the green gun 48, and the blue gun 50. Resistors 52, 54 and voltage source 56 are connected at each of the amplifiers to appropriately control operation of the amplifier whereby signals are divided to their respective guns. Appropriate synchronization is maintained between the movement of the scanning head and the display on the CRT screen.

Further details of the operation of the circuit, as well as alternate embodiments for modifying the circuit are all contained within the description of U.S. Pat. No. 3,909,771 whose description is hereby incorporated by reference and all such embodiments are herein included as being embodiments of the present invention.

In utilizing the circuit heretofore described, the digital values at the output of the inverter 34 are appropriately decoded in accordance with a particular color scale so as to have each digital level control a particular color representation. Accordingly, the different colors are utilized to denote the relative amplitudes of the ultrasonic reflection.

Various color scales can be utilized in order to achieve the best results. One scale which has been found most beneficial is based on the color-temperature scale which uses white, yellow, orange, red, continuing through the greens and blues to the neutral colors of grey and brown. A typical scale utilizes 15 distinguishable colors in addition to black, which represents the absence of a signal.

Thus, the typical amplitude scale covers at least 30 db and is divided up into increments of two db levels. Each of the db levels is arranged by means of the decoder 38 and the circuitry thereafter, so that below zero db there will appear black color; the first increment from 0-2 db will represent brown; the next increment of 2 db will represent red-grey; etc. until the upper end of the range level is achieved where over 30 db will represent white. As a result, when a particular echo pulse is detected, it is converted to a digital value with the amplitude of the digital value representing the intensity of the echo pulse which in turn represents the density of the tissue produced in the echo pulse. This is subsequently decoded and will be displayed in accordance with the assigned level-color relationship.

While such a presentation when utilized by human tissues has been found acceptable, it has been noted that the colors merge almost interperceptibly into each other and tissue interfaces are not easily seen. Accordingly, an improvement can be achieved by interleaving the active colors with bands of black. In this way, visual acuity is enormously improved while at the same time it has been found that no medical information is lost.

The above effect is accomplished as follows. As described in connection with the circuits utilized, it is noted that the color scale is developed by analog-digital conversion of the amplitude of the received ultrasonic echoes. In a typical such system as described, the amplitude scale is represented by individual incremental steps by means of the digital-analog conversion. Any particular steps can be represented by any preselected color. By programming every other step as black, or zero, while assigning the color temperature scale to the remaining physical steps, the result is achieved that each of the active colors are interleaved with bands of black.

Figure 3:
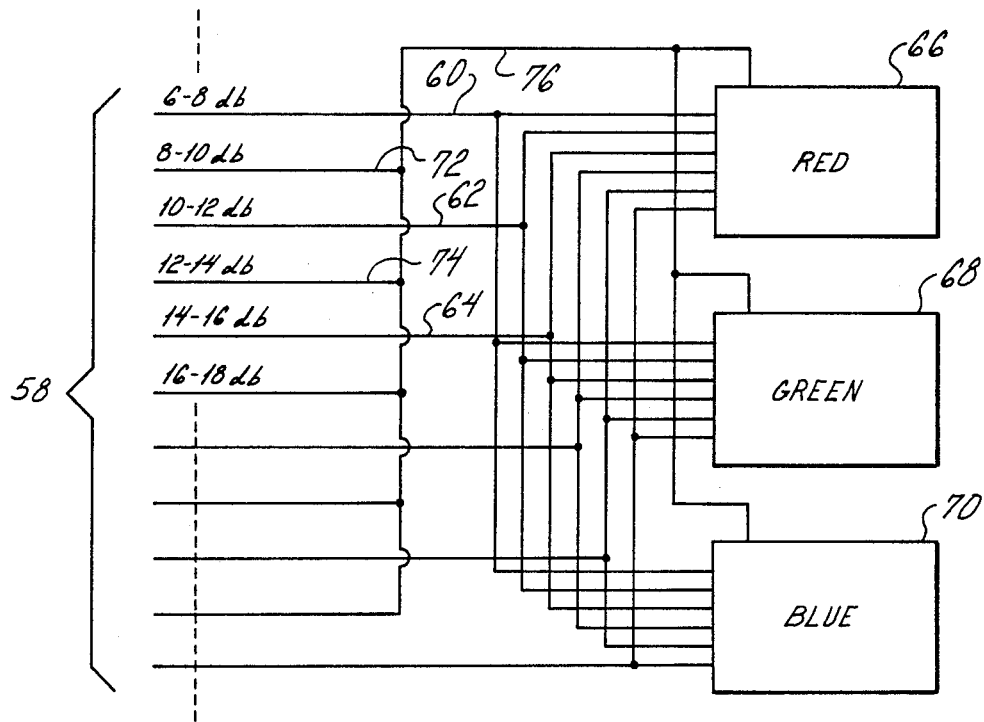
FIG. 3 shows a simplified matrix circuit for programming the level-color relationship.

By way of example, referring now to FIG. 3, there is shown a series of input lines 58 each of which represents a 2 db increment of the digital scale. It is noted that alternate lines 60, 62, 64, etc. are appropriately sent to the three color guns 66, 68, 70 to provide a particular assigned color from the color scale being utilized. The appropriate color will be selected by the intensity of the signal on each of the lines going to the three guns. However, it will be noted that alternate lines 72, 74, etc. are commonly interconnected to the common line 76 and fed as a zero input to each of the three guns whereby any output on these lines will result into a lack of signal which will appear as the color black.

In the system described in connection with FIG. 1, the schematic matrix shown in FIG. 3 could be included whereby the black interleaving is the only output achievable from the ultrasonoscope and will be the only output to be displayed on the color display.

However, alternately, a switchable arrangement can be provided so that the regular continuous color display or the black interleaved display can alternately be selected.

Figure 2:
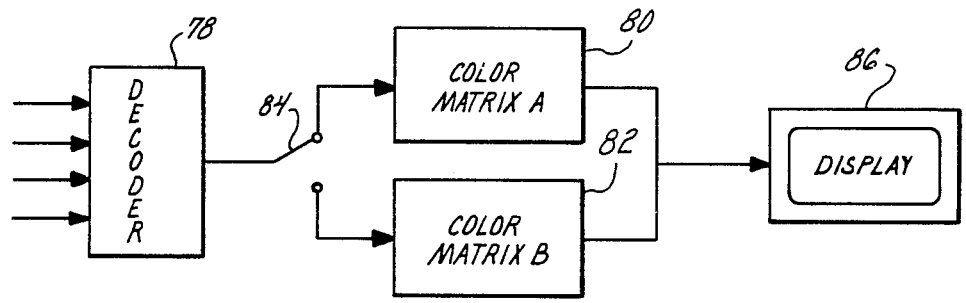
FIG. 2 is a block diagram showing the alternate selectable types of display.

Referring to FIG. 2, there is shown the digital input provided to the decoder 78. At the output there are two programming matrixes 80, 82. Matrix A provides the continuous incremental step where each level is assigned a particular active color in the color scale. The matrix B is arranged so that alternate bands of black appear between the active colors. A switch 84 is used to selectively choose which of the displays should appear on the output display 86.

By way of example, the following Table I indicates an amplitude scale which is divided up in two decimal increments and shows the color when the switch is in position A utilizing the matrix A whereby each level represents an active color. It also shows the color that will appear when the switch is in position B utilizing the matrix B where black is interleaved between the active colors.

TABLE I

| LEVEL | COLOR POSITION A | COLOR POSITION B |
|---|---|---|
| Below 0 db | Black | Black |
| 0 to 4 db | Brown | Brown |
| 2 to 4 db | Red-Gray | Black |
| 4 to 6 db | Blue-Gray | Green |
| 6 to 8 db | Green-Gray | Black |
| 8 to 10 db | Green | Cyan |
| 10 to 12 db | Turquoise | Black |
| 12 to 14 db | Cyan | Blue |
| 14 to 16 db | Blue | Black |
| 16 to 18 db | Magenta | Magenta |
| 18 to 20 db | Violet | Black |
| 20 to 22 db | Red | Red |
| 22 to 24 db | Red-Orange | Black |
| 24 to 26 db | Orange | Orange |
| 26 to 28 db | Yellow-Orange | Black |
| 28 to 30 db | Yellow | Yellow |
| Over 30 db | White | White |

Although a particular color scale has been described, it is recognized that numerous other well known color scales can be similar utilized and within any of these color scales black can be interleaved. Furthermore, it is understood that the incremental steps need not be two decibels but other step values can be utilized and the total range need not be as described but could vary depending upon the amplitudes being scanned. Similarly, the color display need not be limited to the particular type described, but any type of color display can be utilized so long as it produces an output over a color scale.

There has been disclosed heretofore the best embodiments of the invention presently contemplated. However, it is to be understood that various changes and modifications may be made thereto without departing from the spirit of the invention.

What is claimed is:

1. A B-scan ultrasonoscope for displaying a medium comprising:
   ultrasonic transmitter means for radiating ultrasonic signals into a medium;

ultrasonic receiving means for receiving the echo-pulses reflected from portions of the medium, and for providing electrical signals corresponding to the echo pulses, the amplitude of the electrical signas corresponding respectively to the intensity of the echo pulses;

conversion means for converting the amplitude of each electrical signal into a digital value, the digital values extending over a range of values corresponding to the intensity range of the echo pulses;

color display means capable of displaying colors ranging over a color scale;

decoding means for dividing said range of digital values into continuous incremental steps, and identifying the corresponding step of each digital value; and coupling means for coupling alternate ones of said incremental steps to said color display means for causing each of said alternate steps to display a respective incremental discrete color from said color scale, with the remaining ones of the incremental steps providing a black output on the color display means, whereby the medium is displayed in colors outlined in bands of black to enhance visual acuity and identify surface interfaces within the medium.

2. A B-scan ultrasonoscope as in claim 1, and further comprising additional coupling means for consecutively coupling each of said incremental steps to said color display for causing each of said steps to display a respective consecutive incremental discrete color spanning said color scale, and switch means for selectively connecting said coupling means and said additional coupling means between said decoding means and said display means, whereby the medium can be selectively displayed with and without said black band.

3. A B-scan ultrasonoscope as in claim 2, and wherein said range of digital values covers a 32 db amplitude scale and said decoding means divides said range into sixteen 2 db steps.

4. A B-scan ultrasonoscope as in claim 2, and wherein said color scale is the color temperature scale.

5. A B-scan ultrasonoscope as in claim 2, and wherein said transmitting means comprises a scanning head which moves across said medium, said display means comprises horizontal deflection and vertical deflection control, said vertical deflection means being synchronized with the movement of said scanning head, and wherein the spacing between said electrical signals represents distance from the reflecting portions of the medium to said scanning head.

6. An ultrasonoscope as in claim 5, and wherein said conversion means further comprises first circuit means for converting said electrical signals into corresponding digital signals whose values represent incremental steps of a predetermined continuous functional relationship with said series of electrical signals;

second circuit means for converting said digital signals into binary coded decimal values; and third circuit means for converting said binary coded decimal values into said digital values whose values represent incremental steps of another predetermined continuous functional relationship with said electrical signals.

7. An ultrasonoscope as in claim 6, wherein said first circuit means comprises, a comparison means receiving said electrical signals and comparing the amplitude of each of the electrical signals with a sequence of reference inputs forming a continuous sequence of predetermined incremental steps, said comparison means producing for each pulse an output signal indicating the number of steps which said pulse covers.

8. An ultrasonoscope as in claim 7, wherein the continuous sequence of predetermined incremental steps is provided by a voltage divider having a plurality of outputs at predetermined tapped locations, each of said outputs being one of the fractions of a reference input to said comparison means, and voltage source means connected across the voltage divider.

9. A ultrasonoscope as in claim 8, wherein the location of said tapped outputs form said predetermined continuous functional relationship and wherein said functional relationship is a linear one.

10. A ultrasonoscope as in claim 1, wherein said coupling means comprises a decoder having a plurality of outputs, a plurality of incremental resistance means each connected respectively in series with said decoder outputs, and amplifier means receiving the outputs from said decoder and applying them to said display means.

11. A method of color displaying a medium using a B-scan ultrasonoscope with a color display means, comprising the steps of:

(a) scanning the medium with ultrasonic signals;

(b) receiving the echo pulses reflected from portions of the medium;

(c) forming electrical signals corresponding to the echo pulses with the amplitude of the electrical signals corresponding respectively to the intensity of the echo pulses;

(d) converting the amplitude of each electrical signal into a digital value with the digital value expanding over a range corresponding to the intensity range of the echo pulses;

(e) dividing range of digital values into continuous incremental steps;

(f) assigning alternate ones of said incremental steps to display respective incremental discrete colors from a color range which can be displayed on the color display means;

(g) maintaining the remaining ones of the incremental steps to provide a black output on the color display means; and (h) identifying the incremental steps for each digital value and displaying it in accordance with the assigned and maintained colors, whereby the medium is displayed in colors outlined in bands of black to enhance visual acuity and identify surface interfaces within the medium.

12. A method as in claim 11, and further comprising the step of alternately assigning each of said incremental steps to display a respective discrete color to form a continuous coverage of the color range, and selectively utilizing said assignment or alternate assignment.

13. A method as in claim 12 and wherein said color range is a color temperature scale, said digital range covers a 32 db scale with each incremental step being a 2 db step, and wherein said assignments and alternate assignments are as follows:

| INCREMENTAL STEP | ASSIGNMENT | ALTERNATE ASSIGNMENT |
|---|---|---|
| Below 0 db | Black | Black |
| 0 to 2 db | Brown | Brown |
| 2 to 4 db | Red-Gray | Black |
| 4 to 6 db | Blue-Gray | Green |
| 6 to 8 db | Green-Gray | Black |

-continued

| INCREMENTAL STEP | ASSIGNMENT | ALTERNATE ASSIGNMENT |
|---|---|---|
| 8 to 10 db | Green | Cyan |
| 10 to 12 db | Turquoise | Black |
| 12 to 14 db | Cyan | Blue |
| 14 to 16 db | Blue | Black |
| 16 to 18 db | Magenta | Magenta |
| 18 to 20 db | Violet | Black |
| 20 to 22 db | Red | Red |
| 22 to 24 db | Red-Orange | Black |
| 24 to 26 db | Orange | Orange |
| 26 to 28 db | Yellow-Orange | Black |
| 28 to 30 db | Yellow | Yellow |
| Over 30 db | White | White |

* * * * *